United States Patent [19]

Spiegel

[11] 4,116,482
[45] Sep. 26, 1978

[54] VEHICLE AIRFLOW CONTROL DEVICE

[76] Inventor: Leonard Lee Spiegel, 152 Buena Vista, Mill Valley, Calif. 94941

[21] Appl. No.: 787,004

[22] Filed: Apr. 13, 1977

[51] Int. Cl.² ............................................. B62D 35/00
[52] U.S. Cl. ...................................... 296/1 S; 293/65
[58] Field of Search ............................ 296/1 R, 1 S; 224/42.03 R, 42.03 A, 42.42; 105/2 R; 180/1 FV; 293/DIG. 3, 65

[56] References Cited

U.S. PATENT DOCUMENTS 1,466,906  9/1923  Kerr .......................... 224/42.03 A
2,036,560  4/1936  Backus ........................... 180/1 FV

FOREIGN PATENT DOCUMENTS 522,680  8/1921  France ........................... 296/1 S
40,522  7/1932  France ........................ 224/42.42 R Primary Examiner—Joseph F. Peters, Jr.
Assistant Examiner—John A. Carroll
Attorney, Agent, or Firm—Robert H. Eckhoff

[57] ABSTRACT

A device attachable to either end of a vehicle is extendible while the vehicle is underway to effect streamlining at either or both ends of the vehicle.

10 Claims, 13 Drawing Figures

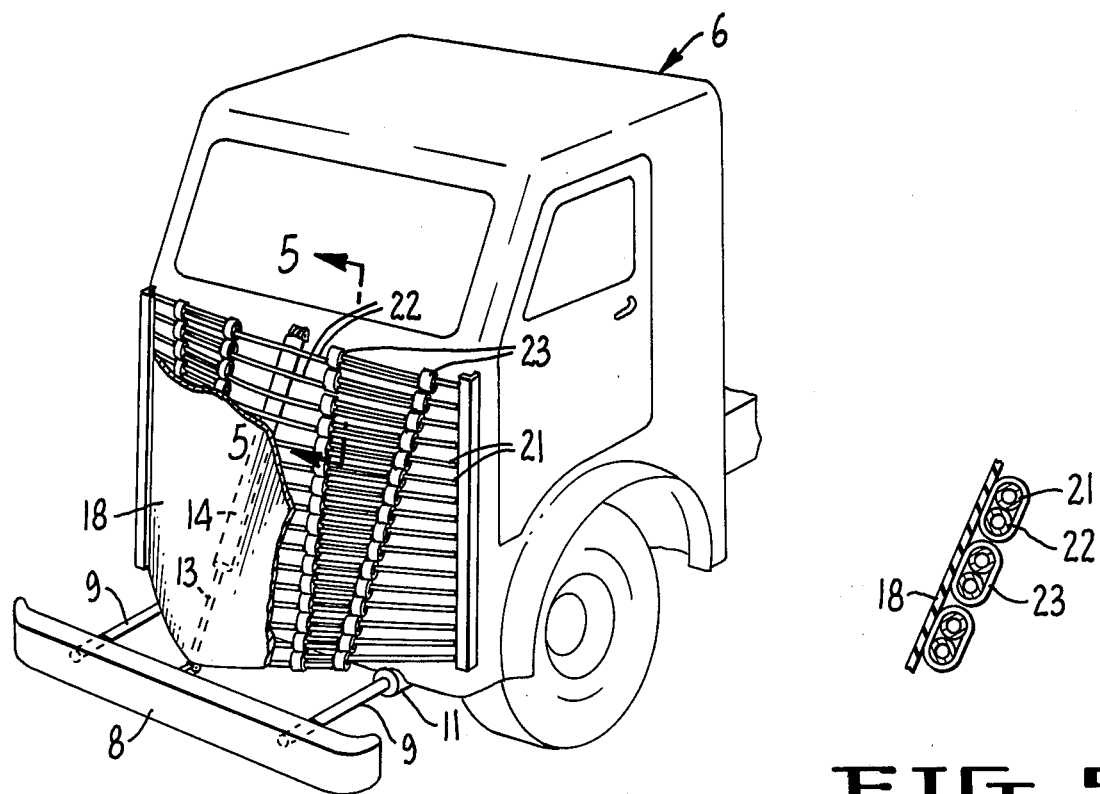
FIG. 4.
FIG. 5.
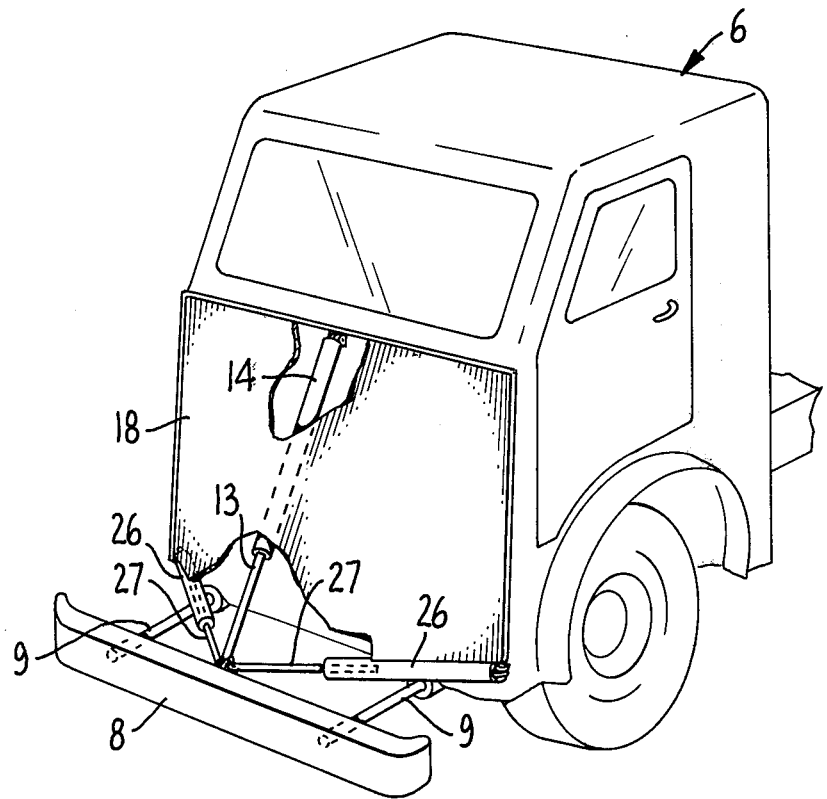
FIG. 6.

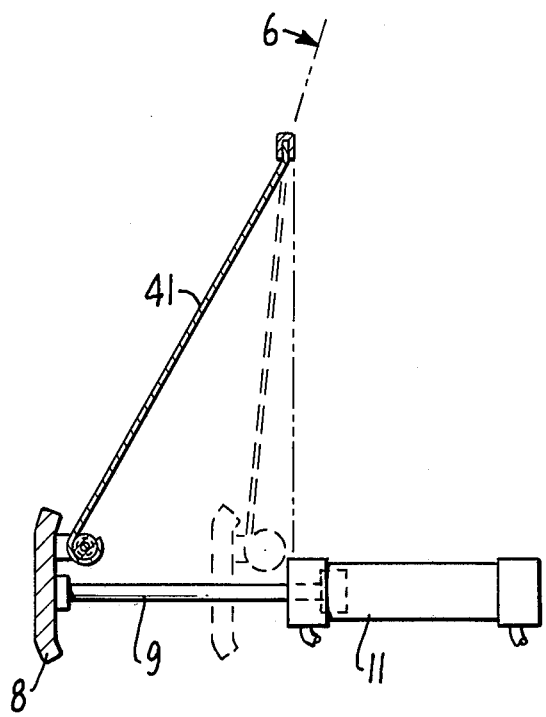
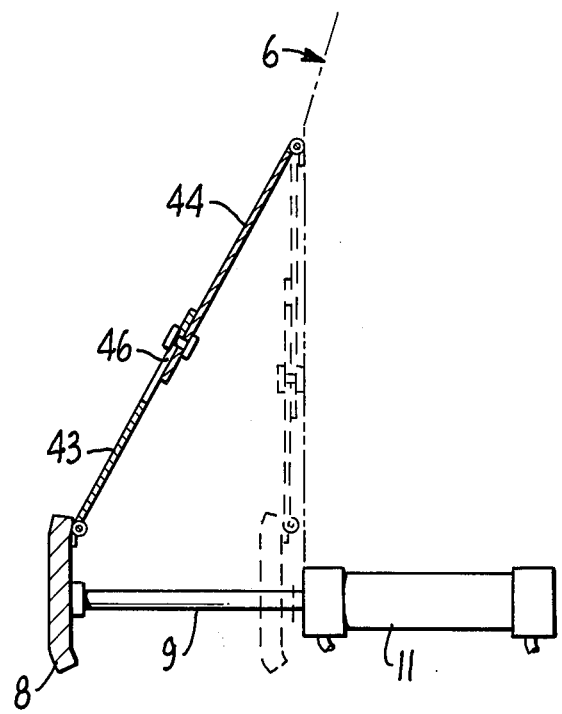
FIG. 11.  FIG. 12.
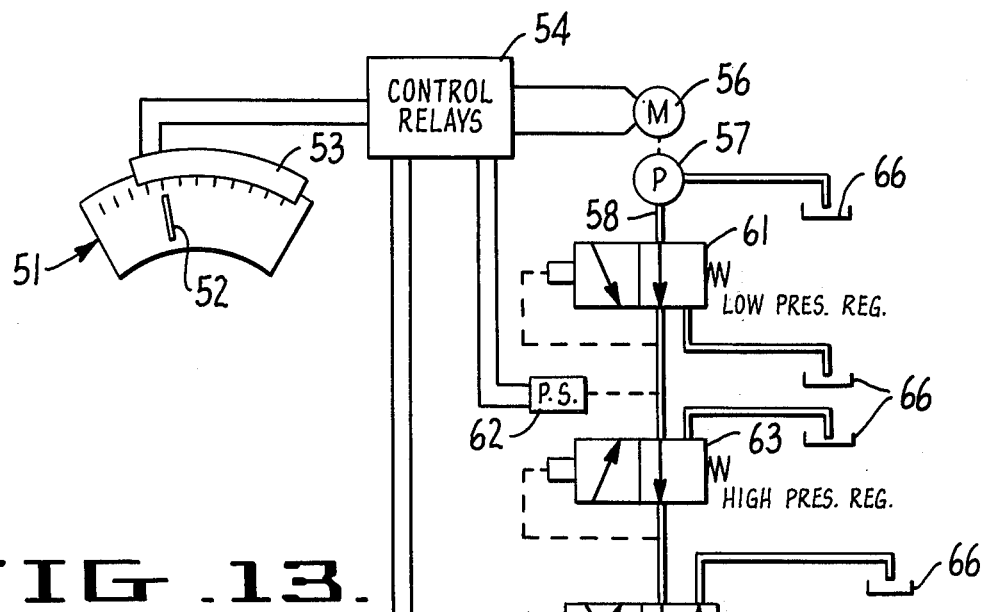
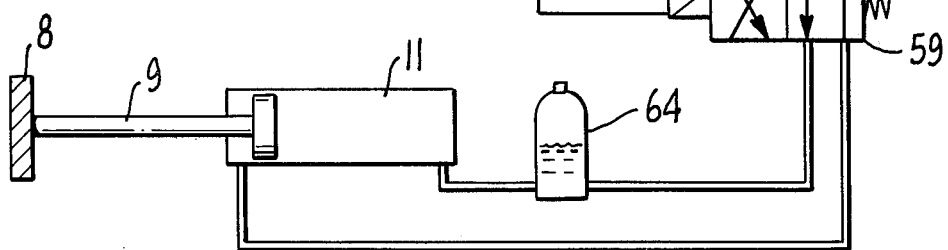
FIG. 13.

VEHICLE AIRFLOW CONTROL DEVICE

BACKGROUND OF THE INVENTION

It has been heretofore proposed to provide streamlining apparatus for motor vehicles, such devices being shown in each of the following U.S. Pat. Nos. Backus 2,036,560 Potter 2,737,411 Madzsar 3,711,146 Wilkerson 3,762,758.

SUMMARY OF THE INVENTION

The present invention contemplates means attached to a bumper at either end of the vehicle which is extendible by means of hydraulic pistons attached to the bumper to effect provision of the streamlining structure.

It is in general the broad object of the present invention to provide streamlining apparatus attachable to either or both ends of the vehicle to effect streamlining of the vehicle.

BRIEF DESCRIPTION OF THE DRAWINGS

FIG. 4 is a perspective view similar to FIG. 1 showing a modified form of the apparatus.

FIG. 5 is a section taken along the line 5—5 in FIG. 4 and showing details of construction of the streamlining apparatus.

FIG. 6 shows another streamlining construction of FIG. 5 in streamlining position.

FIG. 11 is a section taken along the line 11—11 in FIG. 7 showing the operation of the streamlining apparatus.

FIG. 12 is a section taken along the line 12—12 in FIG. 9 showing another modified form of means for extending the streamlining apparatus.

FIG. 13 is a diagrammatic showing of the control mechanism utilized for effecting the streamlining of the vehicle.

DESCRIPTION OF THE PREFERRED EMBODIMENT

Figure 1:
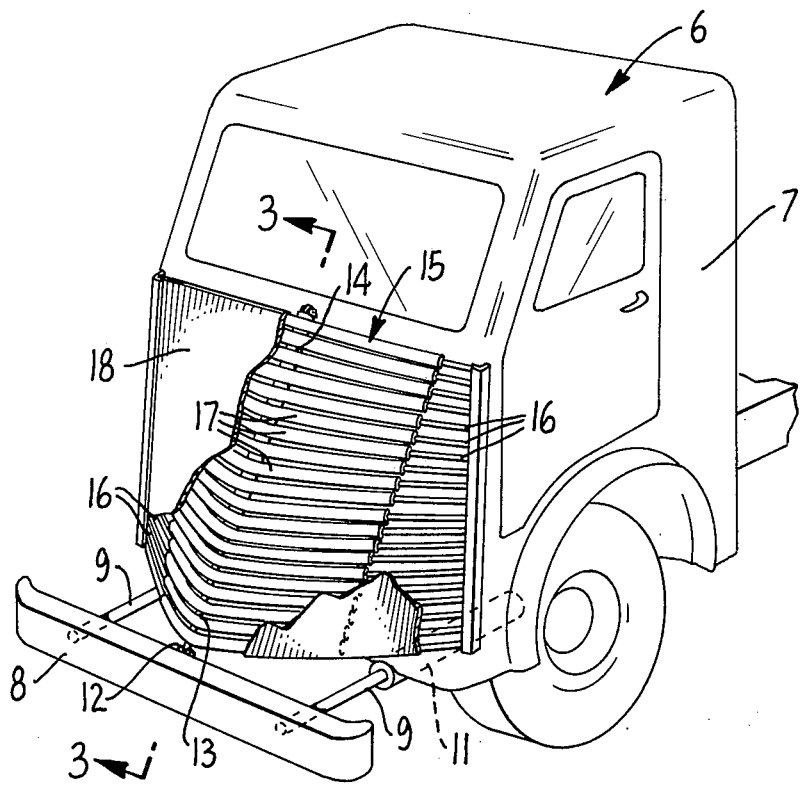
FIG. 1 is a perspective view showing streamlining apparatus attached at the front of the vehicle and operable with the front bumper.
Figures 2, 3:
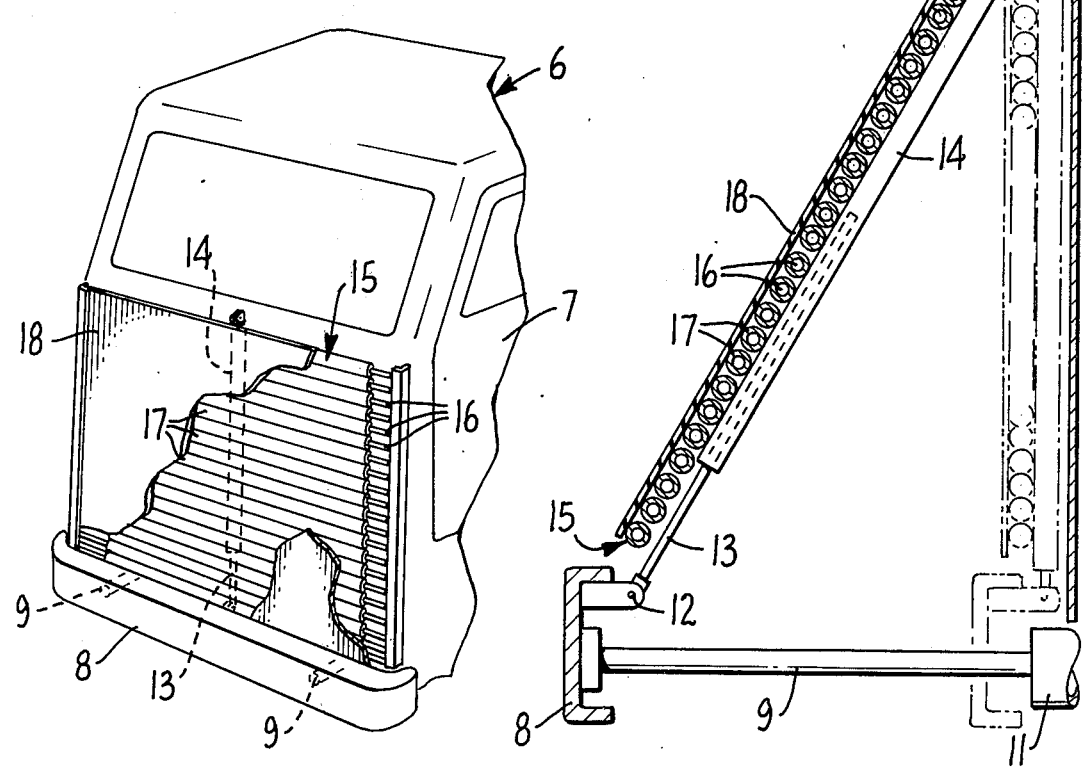
FIG. 2 shows the streamlining apparatus retracted for use at low speed of the vehicle.
FIG. 3 is a section taken along the line 3—3 in FIG. 1.

As appears particularly in FIGS. 1, 2 and 3 of the drawings, the forward end of a motor vehicle, generally designated as 6, is shown as comprising the driver's compartment 7 at the forward end of which a bumper 8 is supported on opposite piston rods 9. The piston rods 9 are supported in hydraulic cylinders 11 so that the piston rods may be moved fore and aft of the vehicle. Attached midway of the bumper 8 is an extension 12 which supports one end of the rod 13 slidable in turn in cylinder 14. A plurality of horizontally extending flexible telescoping members 15 are provided in which rods 16 are slidably mounted in tubular supports 17. A flexible and stretchable cover 18 is mounted over the rods 16 and their tubular supports 17 to provide a smooth forwardly extending surface as appears in FIGS. 1 and 2. In the FIG. 2 position, the bumper is retracted and the cover 18 presents a blunt surface to the atmosphere as the vehicle moves forwardly at a lower speed. When the vehicle attains a given predetermined speed, the bumper 8 is moved forwardly and the respective rods 16 and tubular supports 17 are moved so that the cover 18 presents a smooth streamlined surface to the atmosphere to streamline the forward portion of the vehicle.

In that form of the invention shown in FIGS. 4 and 5, much the same construction is utilized, except that the horizontally extending elements corresponding to members 15 in FIGS. 1, 2 and 3 are made in two parts 21 and 22. Rods 21 are uppermost while rods 22 are lowermost. Each rod carries a cylinder structure 23 at its end which slidably supports the other adjacent rod. By using these overlapping rods, the overall length required may be changed so that the desired extension can be achieved. Similar to FIGS. 1-3, extension of the bumper is achieved by utilizing the cylinder 11 and piston rods 9 while sheet 18 overlies rods 21 and 22.

The structure in FIG. 6 shows a stretchable streamlining sheet 18 which is supported along its lower edge by telescoping rods 26 and 27.

Figure 7:
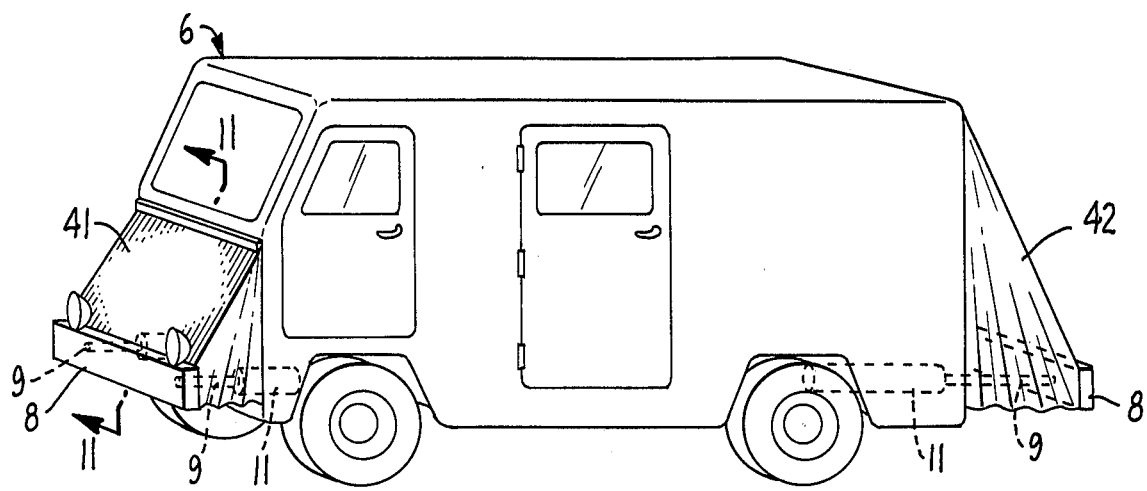
FIG. 7 is a side elevation of a vehicle having streamlining means provided at both ends of the vehicle and in position to effect streamlining.
Figure 8:
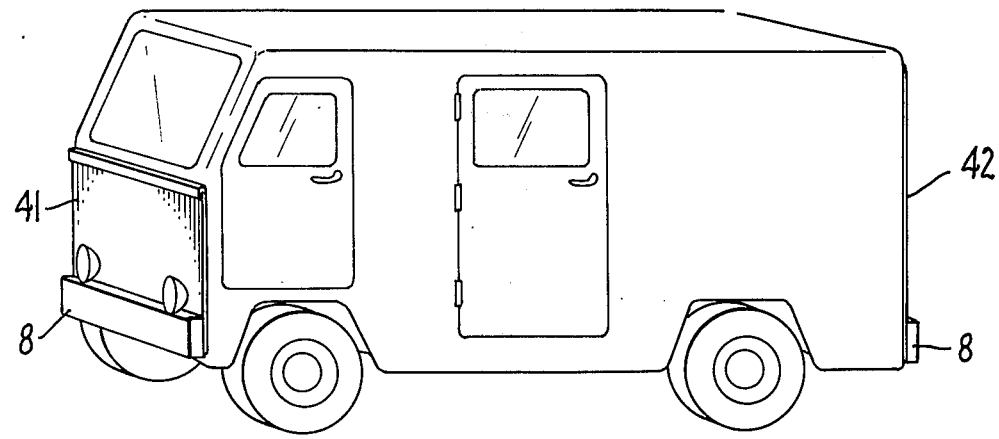
FIG. 8 is a perspective view of the vehicle shown in FIG. 7 with the streamlining apparatus retracted.

In FIG. 7, I have shown substantially similar structure provided at the rear of the vehicle as well as in the forward portion of the vehicle so that the vehicle is streamlined at both ends once a given speed is attained. In the instance of FIGS. 7, 8 and 11, in place of using the plurality of rods, the streamlining effect is provided at each end of the vehicle by means of the flexible curtain 41 and 42 which extends between the bumper and the vehicle proper to provide the necessary streamlining.

Figure 9:
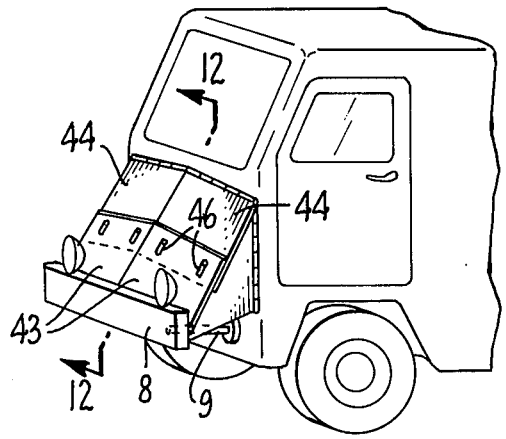
FIG. 9 is a perspective view showing another modified form of streamlining apparatus attached at the front end of the vehicle.
Figure 10:
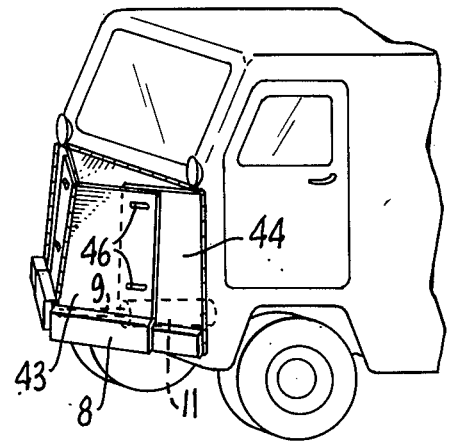
FIG. 10 is another perspective view of another form of apparatus embodying the present invention.

In the embodiments shown in FIGS. 9, 10 and 12, plates 43 and 44 are respectively hinged to the bumper and vehicle body and are mutually slidable using slotted connections 46.

In FIG. 13, I have shown diagrammatically an apparatus for achieving the necessary supply of fluid to effect extension of pistons 9 in cylinders 11. Referring to the showing in FIG. 13, a speed indicating instrument, such as a modified speedometer, is generally indicated at 51. Indicator dial 52 moves adjacent switch means 53 and closes switch contacts (not shown) when the vehicle is operating above some predetermined speed. Control relays 54 are responsive to switch means 53 and start motor 56 to drive hydraulic fluid pump 57 and pressurize line 58. Solenoid actuated control valve 59 is also controlled by relays 54 and acts to supply fluid under pressure to either the front or rear parts of cylinder 11 in order to either retract or extend piston 9 and bumper 8 depending upon the speed of the vehicle. Included also in line 58 are low pressure regulator valve 61, pressure sensing switch 62, high pressure regulator valve 63 and accumulator 64. During impact with bumper 8, fluid from the rear of cylinder 11 will initially be taken up in accumulator 64. If the impact is substantial, high pressure regulator valve 63 will bypass the fluid in line 58 to the fluid reservoir 56. Low pressure regulator valve 61 protects pump 57 and motor 66 in a conventional manner while pressure sensing switch 62 allows control relays 54 to intermittently run motor 56 and maintain fluid pressure in line 58.

I claim:

1. A streamlining device for attachment to a land vehicle comprising:
a bumper attached to a land vehicle to be movable toward and away of that vehicle;
bumper moving means on the land vehicle for moving said bumper while the vehicle is in motion;
an air deflecting structure attached to the land vehicle at one end of that vehicle to be essentially upright and to have a top end and a bottom end, said air deflecting structure top end being immovably attached to the land vehicle and said air deflecting structure bottom end being immovably attached to said bumper to be movable therewith so that said air deflecting structure moves with said bumper to change the orientation of said air deflecting structure with respect to the land vehicle as said bumper is moved toward and away of the land vehicle; and
control means on the land vehicle controlling said bumper moving means to move said bumper while the vehicle is in motion so that at low speeds said bumper is located in a position closely adjacent the vehicle one end and said air deflecting structure is essentially vertical to be flush with the vehicle one end and thereby define a blunt surface to the atmosphere, and at higher speeds said bumper is located in a position spaced from the vehicle one end and said air deflecting structure bottom end is spaced from the vehicle one end thereby tilting said air deflecting structure with respect to the vehicle into a streamlining orientation with respect to the vehicle.

2. A streamlining device for a land vehicle as defined in claim 1 further including a plurality of transversely extending piston rods movable into and out of horizontally extending cylinders to move the streamlining device into and out of a streamlining position.

3. The streamlining device as defined in claim 1 wherein said bumper moving means includes a fluid power system.

4. The streamlining device as defined in claim 3 wherein said fluid power system includes a reservoir to receive fluid when said bumper impacts an object.

5. The streamlining device as defined in claim 1 wherein said control means includes a speed indicating instrument.

6. The streamlining device as defined in claim 1 further including a plurality of telescoping members attached to the vehicle, said telescoping members each including a rod mounted in a tubular support.

7. The streamlining device as defined in claim 6 further including a flexible, stretchable cover mounted on said telescoping members.

8. The streamlining device as defined in claim 6 wherein a pair of telescoping members are each mounted on the vehicle to contact said bumper.

9. The streamlining device as defined in claim 1 further including a second air deflecting structure on another end of the vehicle.

10. The streamlining device as defined in claim 1 wherein said air deflecting structure includes a plurality of plates hingedly connected to said bumper and to the vehicle.

* * * * *